United States Patent Office 3,830,893
Patented Aug. 20, 1974

3,830,893
METHOD OF PROCESSING HIGH NITRILE PREFORMS
Samuel Steingiser, Bloomfield, Conn., assignor to Monsanto Company, St. Louis, Mo.
Filed Apr. 25, 1972, Ser. No. 247,409
Int. Cl. B29c *17/07, 25/00;* C08f *29/56*
U.S. Cl. 264—25            7 Claims

ABSTRACT OF THE DISCLOSURE

Tubular preforms formed of a synthetic resin, the major constituent of which is polymerized nitrile monomer selected from the group consisting of acrylonitrile, methacrylonitrile and mixtures thereof, are rapidly heated to a temperature at which molecular orientation occurs on stretching by exposing the body portions of such preforms to microwave energy for a period of from ½ to 30 seconds to heat such body portions to a temperature of between 250 to 320° F. without deforming a prior molded finished neck section thereof and without substantially degrading the resin.

BACKGROUND OF THE INVENTION

This invention relates to heating and more specifically to rapidly heating special heat sensitive, thermoplastic shapes while preserving the dimensional integrity of the shapes and the quality of the thermoplastic material.

Lightweight thermoplastic containers for packaging environmentally sensitive materials such as carbonated soft drinks, beer, perfumes, foods, pharmaceuticals, etc. have been appearing recently in the marketplace. Such containers depend to a major extent for their functional success on the low permeability characteristics of the thermoplastic, such characteristics resulting from the highly polar nature of the molecular structure of the polymers forming the thermoplastic material. Typical of such materials are those wherein a major constituent of the plastic (between 55 to 85 weight percent) is a polymerized nitrile-group-containing monomer such as acrylonitrile, methacrylonitrile and mixtures thereof. Such nitrile-base materials though possessing excellent barrier and tensile strength properties do tend to be somewhat brittle by nature and it is known that multi-axially stretching within specific temperature limits to preferentially orient the molecules in the direction of stretch will improve the impact resistance thereof, the latter characteristic being highly desirable in containers formed from such materials.

It is likewise known that such stretching can be done just prior to or simultaneously with molding (e.g. blow molding) these thermoplastics into container shapes. To be competitive with glass containers for similar applications, it is essential that such stretching and molding be carried out at high speeds on rapidly cycling molding equipment. A minimum cost approach to such molding involves initial shaping of the plastic into a preform configuration in equipment adjacent that at which the plastic is extruded and then shipping or transferring the relatively small preforms to another location such as a satellite plant for heating and blow molding into the finished articles. In view of the greatly reduced size of such preforms in comparison with that of the finished container, shipping and storage costs are substantially lower with this approach to container molding. However, in order to realize the full economics of such a process, all operations occurring at the satellite molding location(s) must be carried out at high speed, since the economics of the overall process are only as good as its weakest link or slowest phase.

One of the steps involved at the satellite plant or location necessarily involves reheating the preforms to orientation temperature just prior to stretching and blowing. Ambient temperature can obviously vary widely depending on the site of manufacture and is the normal environmental temperature of such area. It must be kept in mind that such reheating cannot be done indiscriminately in view of the relatively delicate nature of the special heat sensitive, high nitrile thermoplastic, which by nature possesses a low thermal conductivity and the necessary quality of the surface detail of the finished article to be molded therefrom. This is especially true when the finished article is a container such as a bottle for holding a beverage at superatmospheric pressure such as a carbonated soft drink or beer, such a container requiring that the finish be held within relatively close tolerances in order to accept a tight fitting closure adequate to contain the internal pressures generated which can range from 15 to 150 p.s.i.g. depending on the temperature of the contents.

With methods of reheating such preforms which depend on an external heat source, the heat gradient from the outside wall of the preform to the inside wall becomes the limiting factor on rate, and the time to reach thermal equilibrium is protracted due to the low thermal conductivity of the polymer. An appreciable increase in such thermal gradient for the purpose of reducing heating time can be expected to cause severe overheating of the outer regions of the wall and consequently subsequent thermal decomposition, undesirable cross linking or depolymerization of the thermoplastic material.

SUMMARY OF THE INVENTION

In accordance with this invention, however, there has now been discovered a special method for rapidly and selectively molecularly heating special plastic shapes up to orientation temperature in a minimum time period without degrading or adversely affecting the plastic.

Accordingly, a principal object of this invention is to heat tubular preforms formed of high nitrile polymers to orientation temperature at very fast rates.

Another object of this invention is to carry out such heating at high rates without being dependent on a thermal gradient to reach equilibrium.

A further object of this invention is to provide such a heating method for use as an integral step in a multi-step process for high speed molding of molecularly oriented bottles for holding carbonated beverages, which method takes advantage of the inherent nature of the high nitrile material required for such an end use without in any way necessitating modification of the thermoplastic to make it compatable with such high rate heating.

Other objects of this invention will in part be obvious and will in part appear hereinafter.

These and other objects are accomplished by providing a high speed method of preparing a molded, heat sensitive article for further forming into a container which comprises exposing the body portion of a finished neck tubular thermoplastic preform to microwave energy for a period of between ½ to 30 seconds to preferentially heat the body portion from ambient to molecular orientation temperature without deforming the neck and without substantially degrading the thermoplastic, said thermoplastic comprising as the major constituent thereof polymerized nitrile monomer selected from the group consisting of acrylonitrile, methacrylonitrile and mixtures thereof.

BRIEF DESCRIPTION OF THE DRAWINGS

In describing the overall invention, reference will be made to the accompanying drawings in which.

DETAILED DESCRIPTION OF THE ILLUSTRATED EMBODIMENTS

Figure 1:
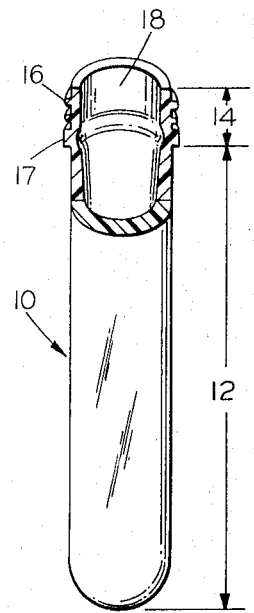
FIG. 1 is a perspective view with a portion broken away of a molded preform shape for use in the present invention.

Referring now to the drawings, there is illustrated in FIG. 1, an elongated tubular preform 10 from which a bottle will be molded. Preform 10 comprises a body portion 12 and a finish portion 14 which includes integral fastening means such as helical threads 16 for subsequent cooperation with closure means (not shown) such as a cap to close off opening 18, after preform 10 has been converted into a bottle for use in holding a carbonated beverage under pressure. Preform 10 has been previously molded by conventional means such as injection and/or blow molding, at which time finish 14 has been very accurately formed to close tolerances and is not intended to be further modified or altered in any way that would affect the necessary tight sealing cooperation with the aforesaid closure means.

Preform 10, though illustrated as having vertically straight walls, can be varied in cross section along its length if such is desirable, e.g. in order to obtain a particular wall distribution pattern in the finished container. Though the wall thickness and weight of the preform 10 may vary widely, it generally has relatively thick walls along body 10 typically ranging from 150 to 210 mils, and typically weighing between 15 to 75 grams. Preform 10 is formed of a thermoplastic material comprising 70/30 weight percent polymerized acrylonitrile/styrene copolymer which is highly polar by nature and has permeability properties of less than 1.5 and 4.0 cc./day/100 sq. in./mil-atm. at 73° F. of $O_2$ and $CO_2$ respectively. The copolymer defining preform 10 is preferably free of any lossy additives conventionally used to facilitate molecular heating in the manner to be hereafter described.

Figure 2:
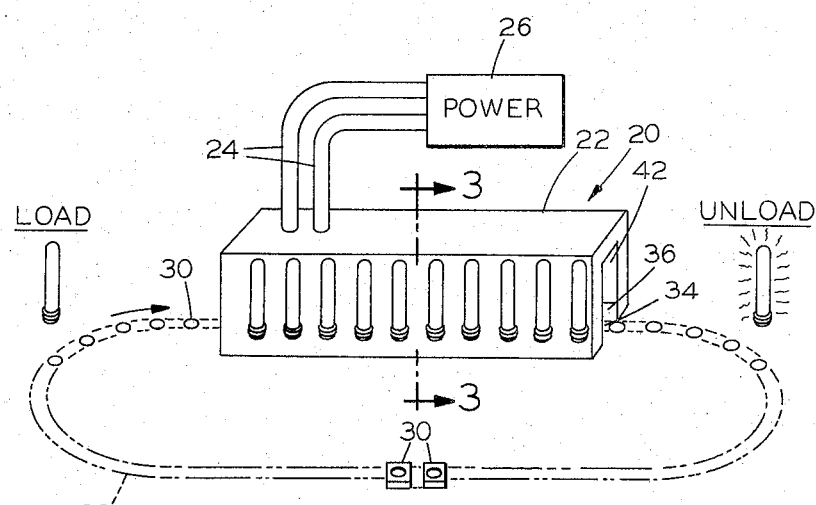
FIG. 2 is a schematic diagram illustrating preforms as shown in FIG. 1 in the process of the present invention.

Referring now to FIG. 2, apparatus 20 is schematically shown for raising the temperature of each body portion 12 of a plurality of preforms 10 to within the temperature range at which substantial molecular orientation occurs on stretching. For the high nitrile polymer of the present invention, this temperature range is between 250 to 320° F. and preferably between 270 to 310° F. At temperatures above 320° F., the thermoplastic material tends to be too fluid to develop preferential alignment of the molecules in the direction of draw, whereas at temperatures below 250° F., the forces necessary to stretch the plastic to any appreciable extent are excessive.

Heating equipment 20 comprises a wave guide 22 which includes connector portions 24 operatively associated with microwave energy power source 26. Such a source is the Varian PPS–30A Power Pack manufactured by Varian Associates, Industrial Microwave Systems, 611 Hansen Way, Palo Alto, Calif. 94303. Wave guide 22 serves as an applicator for coupling or transferring the electrical energy generated by source 26 into the plastic preforms in a predetermined manner.

Microwave energy requirements for the high rate heating process of the present invention are dictated by the direct proportionality of heating rate to the (a) applied voltage, (b) frequency of the electrical input and (c) dielectric loss factor of the high nitrile materials of which the preforms are formed. For purposes of this invention, preferred frequencies are those between 100 and 24,000 megahertz whereas the voltage limiting factor is the dielectric breakdown in air, and within these voltage and frequency limits, the dielectric loss factor $\epsilon''$ for the temperature range to which the high nitrile preforms will be exposed should be between 0.030 and 0.230. Within the aforementioned frequency ranges, the FCC authorized Industrial, Scientific and Medical (ISM) bands are 915, 2450, 5800 and 22,000 megahertz (±25 mHz. in each case) and accordingly, these are the particularly preferred frequencies.

Figure 3:
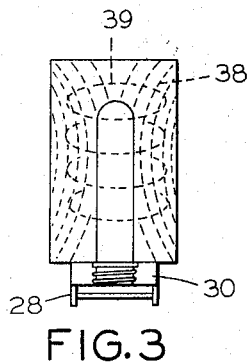
FIG. 3 is a sectional view taken along 3—3 of FIG. 2.

Referring now to FIG. 3, the electrical field distribution as illustrated schematically by means of dotted lines 38 and 39 for purposes of the present invention should be specifically designed to promote relatively uniform exposure of the elongated body portion of the preform in order to promote uniformity of temperature increase throughout such body portion in the shortest possible exposure time. In the embodiment of FIG. 2, such distribution is axially 38 and circumferentially 39 cylindrical with respect to the body 12 of each preform 10.

Figure 4:
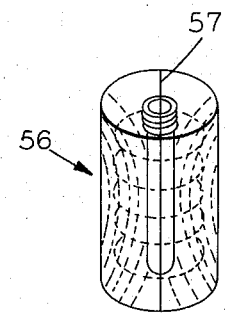
FIGS. 4 and 5 are sectional views of alternative types of wave guides useful in the method of the present invention.

In the embodiment of FIG. 4, the electromagnetic field is shaped or configured in a predetermined manner with respect to tubular body portion 12 to preform 10 by varying the geometry of the wave guide from that of FIG. 3. Thus, though the field distribution is generally the same as that illustrated for wave guide 22 having a rectangular cross section in that it is axially and circumferentially cylindrical with respect to the tubular body of each preform, wave guide 56 is of a generally cylindrical cross section, being designed to rapidly open and close about parting line 57 with neck portion 14 of preform 10 protruding from the interior thereof.

Figure 5:
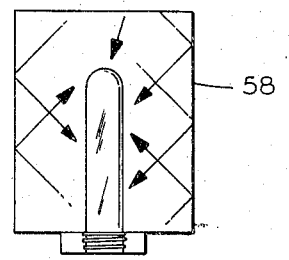

In FIG. 5, shaping of the electromagnetic field is accomplished by varying the size of the wave guide as opposed to the geometry thereof. Thus, wave guide or cavity 58 is rectangular in cross section as is that illustrated in FIGS. 2 and 3, but is considerably larger than the latter. With the type of wave guide illustrated in FIG. 5, electromagnetic field distribution is meant to be random in nature with respect to the body of the preform, bouncing in an undetermined manner off of the bottom top and side walls of wave guide cavity 58 as illustrated by the arrows thereon, the theory being that the more random the field distribution, the more uniform the exposure of the preform.

In operation, preforms 10 are sequentially inserted either manually or automatically into holders 30 at a loading station upstream of apparatus 20 such that each neck portion 14 is enclosed within a holder 30 as illustrated in FIG. 3 and protrudes from the interior of wave guide 20 during its passage therethrough, and consequently is outside the imposed electromagnetic field. It should be realized, however, that segregation of the neck finish from the interior of the wave guide may not be essential, e.g. the neck portion, shielded in an appropriate manner, may likewise be exposed to the microwave energy or alternatively, the field may be fashioned to preferentially heat the body portion of an unshielded preform which is entirely within the confines of the wave guide. In the present invention, however, protection of the portion 14 of the integral preform from full exposure to the electromagnetic field for heating the body portion thereof is essential, since, as mentioned previously, the neck portion of the preform is in finished shape at this stage of the process and further modification is not desired. During passage of each preform 10 through wave guide 22, the sinusoidal electromagnetic field illustrated as 38 and 40 reacts with the polar nitrile molecules thereof through the full wall of the body portion, thus exciting or setting the molecules into oscillating motion thereby generating frictional heat relatively evenly through the wall of the body on a molecular scale. Due to the nature and weight of the thermoplastic, and the frequency, voltage and power supplied by source 26, the body portion of each preform 10 can be brought to a temperature within the range of from 250 to 320° F. after a very short residence time within wave guide 22, i.e. from ½ to 30 seconds. Each preform is removed from exposure to such field on leaving exit end 42 of wave guide 22 on conveyor 28, is then removed from its holder 30 immediately downstream of exit end 42, and then inserted either manually or automatically between partible sections 44 and 46 of blow mold 48 while the temperature thereof is within the molecular orientation temperature range in order to complete the process by carrying out a thermoforming orienting step thereon to form a container. The term thermoforming is meant to include all types of molding including blow molding from heated thermoplastic material. It should be realized that it may be possible to heat the body portion of the preform above the molecular orientation temperature range in apparatus 20 to compensate for any temperature drop that may occur during transfer and such is within the scope of the invention as long as the body portion is within the orientation temperature range during the thermoforming orienting step(s). After enclosure of the preform between such mold sections, whereby threads 16 and shoulder 17 of the preform are supportingly surrounded by opposing portions of the blow mold sections, a stretching mechanism 50 is moved into place over the end opening in the closed mold and rod member 53 caused to move downwardly within and against base 51 of each preform (shown in phantom in its initial position within the mold) to axially stretch the body portion 12 against lower wall 52 of mold 58. Simultaneously with or immediately thereafter, an expanding medium issuing from orifices 54 in rod 52 is admitted into the interior of each preform to blow it outwardly against the cavity walls of the mold sections to form the container which, in the illustrated embodiment, is a bottle.

The following examples are given to illustrate more clearly the principle and practice of this invention to those skilled in the art and are not for the purpose of limitation. All percentages are by weight unless otherwise indicated.

EXAMPLE I

Figure 6:
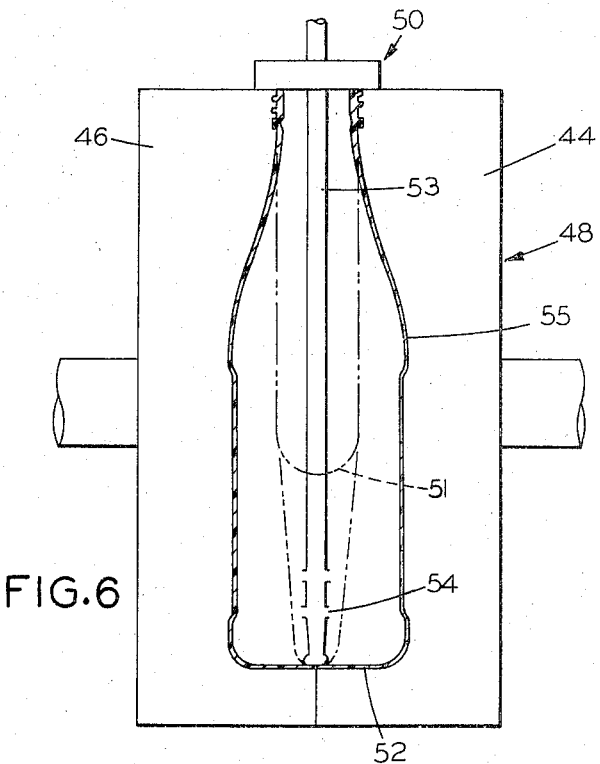
FIG. 6 is a vertical, schematic view illustrating the orienting and container forming steps of the present invention.
Figure 8:
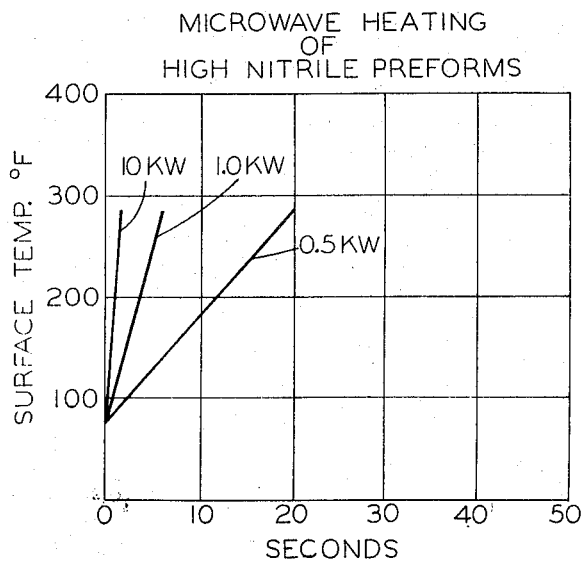
FIG. 8 is a graph illustrating the results in terms of time-temperature diagrams of the process of the present invention.

A series of 40 gram preforms shaped as illustrated in FIG. 1 and made of a polymer comprising a 70/30 mixture of polymerized acrylonitrile/styrene monomer and having a wall thickness throughout of between 0.175 ±.005 inches at an ambient temperature of 73° F. were inserted in holders 30 mounted on conveyor 28 and passed through wave guide 22. Power source 26 was set to provide 10 kw. power output at 2450±25 megahertz frequency. A variable speed motor on drive conveyor 28 is set to provide a maximum residence time of the preform within wave guide 22 of ½ second. On leaving exit end 42 the surface temperature of the body portion of the preform is measured by means of a scanning infrared thermometer situated immediately adjacent exit end 42. The physical appearance of the preforms to the eye was the same as that on entering wave guide 22, showing no degradation or surface breakdown. The body portions were soft and deformable but sufficiently rigid as to hold their shape under the influence of their own weight. Each finish portion 14 was pronouncedly cooler than its body 12, indicating that heating had preferentially taken place along the body portion thereof. As illustrated in FIG. 8, the preform body surface temperature at this power level, frequency and ½ second maximum residence time in wave guide 22 is measured as approximately 290° F., such temperature lying well within the 250–320° F. range at which substantial orientation occurs on stretching the particular nitrile material of the preform. Each thus heated preform was removed from its holder 30 and immediately enclosed within a blow mold in the manner illustrated in FIG. 6, axially stretched and expanded outwardly within the mold to form a bottle in the manner heretofore described.

EXAMPLE II

The procedure of Example I is repeated with an additional set of preforms except that this set of preforms are formed of a 90/10 mixture of polymerized methacrylonitrile/styrene monomer, the drive system for conveyor 28 is slowed somewhat from that of Example I, and the power supply reduced to 1.0 kw. It was found that substantially the same preform surface temperature could be reached on exit of the preforms from wave guide 22 after a maximum residence time therein of about 3 seconds, the surface temperature profile thereof being illustrated versus time in FIG. 8.

EXAMPLE III

The procedure of Example II was repeated except that the power source 26 was set to provide 0.5 kw. of power at the 2450 megahertz frequency. The temperature profile versus time is illustrated likewise in FIG. 8.

EXAMPLE IV

This example is presented for purposes of comparison only and is not an example of the present invention.

Figure 7:
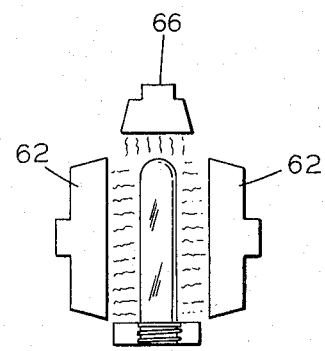
FIG. 7 is a schematic view of an alternative form of heating system for comparison with that of the present invention.

The procedure of Example I is repeated except that each preform is passed between three banks of movably mounted infrared heaters as illustrated at 62, 64 and 66 in FIG. 7, such heaters surrounding the preform in the manner illustrated, the heating surfaces of units 62 and 64 being spaced from each other a distance of approximately 2 inches (preform diameter is 1 inch) with unit 66 being spaced 1½ inches from the closed end of the preform. Each of infrared elements 62, 64 and 66 for heating the preform are rated at 500 watts, being capable of emitting infrared heat at approximately 30 watts/sq. inch, the face temperature of each heater being approximately 1000° F. It was found that after a period of approximately 30 seconds exposure in this manner that the surface temperature of the polymer was approximately 1000° F., the preforms having a charred severely blistered surface which rendered it completely unsuitable for further shaping. By manipulating the spacing of units 62, 64 and 66 for subsequent preforms passed therebetween, it was found that exposure times of some 275 seconds were required to provide a heated preform body which could be successfully axially stretched and radially expanded into an acceptable bottle. For exposure periods of between about 30 and 270 seconds, the physical appearance of the preform surface improved as the severity of the heat gradient was diminished, however, because of still present rather severe thermal gradients through the preform wall, a container could not be successfully thermoformed, each preform blowing out or rupturing at one or more localized hot spots during expansion within the blow mold.

The above description and particularly the drawings are set forth for purposes of illustration only and are not to be taken in a limited sense.

The nitrile monomers suitable for use in making the polymers from which the preforms and containers of the present invention are fabricated are acrylonitrile, methacrylonitrile and mixtures of same. The level of polymerized nitrile monomer in the polymer must be at least 55 weight percent (e.g. 55 to 85 weight percent) in order that the molded container have the necessary barrier properties to allow successful use. A particularly preferred polymer comprises from 60 to 80 weight percent polymerized acrylonitrile. For such high nitrile orientable materials, the temperature range within which substantial molecular orientation occurs on stretching (i.e. orientation sufficient to impart appreciable impact resistance to the polymer) is within the range of between 250 to 320° F.

Theoretically any monomer or monomers which are copolymerizable with the nitrile-group-containing component of the polymer may be employed in the practice of this invention assuming they would not substantially diminish the desirable barrier properties of the polymer, or interfere with the dielectric heating capability of the resin. Such a co-monomer is desirably, though not necessarily, present for the purpose of improving the melt processability of the thermoplastic. Exemplary of such monomers are ethylenically unsaturated aromatic compounds such as styrene, alpha-methyl, styrene, ortho-, meta-, and para-substituted alkyl styrene, e.g., ortho-methyl styrene, ortho-ethyl styrene, para- methyl styrene, para-ethyl styrene, ortho-, meta-, or para-butyl styrene, ortho-, meta-, or para-butyl styrene, ortho-, meta-, or para-secondary butyl styrene, ortho-, meta-, or para-tertiary butyl styrene, etc., alpha-halogenated styrene, e.g., alpha-chlorostyrene, alpha-bromostyrene, ring-substituted halogenated styrenes, e.g., ortho-chlorostyrene, para-chlorostyrene and the like; esters of ethylenically unsaturated carboxylic acids e.g., methyl acrylate, methyl methacrylate, ethyl methacrylate, ethyl acrylate, butyl-acrylate, propyl acrylate, butyl methacrylate glycidol acrylate, glycidol methacrylate, and the like, ethylenically unsaturated acids, carboxylic acids such as acrylic acid, methacrylic acid, propacrylic acid, crotonic acid, and the like. Vinyl esters, e.g. vinyl formate, vinyl acetate, vinyl proprionate, vinyl butyrate, etc.; vinyl and vinylidene halides, e.g., vinyl chloride, vinyl bromides, vinylidene chloride, vinyl fluorides, etc.; vinyl ethers, e.g. methyl vinyl ether, ethyl vinyl ether, propyl vinyl ether, alpha-olefins, e.g., ethylene, propylene, butene, pentene hexene, heptene, oxtene, isobutene and other isomers of the foregoing.

Various modifications and alterations of the invention will be readily suggested to persons skilled in the art. It is intended therefore, that the foregoing be considered as exemplary only and that the scope of the invention be ascertained from the following claims.

What is claimed is:

1. A high speed method of forming a container from a molded thermoplastic polymer preform having a finished neck tubular portion and a body portion, which method comprises exposing the body portion of said preform to a microwave energy field for a period of from ½ to 30 seconds to increase the temperature of said body portion through the full wall thickness thereof from ambient to orientation temperature while protecting said neck portion from exposure during exposure of said body portion, said field being characterized by a frequency of from 100 to 24,000 megahertz and a voltage not in excess of the dielectric breakdown of the thermoplastic material in air, and then removing said body portion from said field and subjecting the body portion to a thermoforming orienting step to form a container before the body portion has cooled appreciably, said thermoplastic polymer having at least 55 weight percent thereof formed of polymerized monomeric groups selected from the group consisting of acrylonitrile, methacrylonitrile and mixtures thereof.

2. The method of claim 1 wherein the frequency of said microwave energy is substantially 915 megahertz.

3. The method of claim 1 wherein the frequency of said microwave energy is substantially 2450 megahertz.

4. The method of claim 1 wherein the major constituent of the thermoplastic is polymerized acrylonitrile monomer.

5. The method of claim 1 wherein the major constituent of the thermoplastic is polymerized methacrylonitrile monomer.

6. In the method of forming a molecularly oriented container from a preform made of thermoplastic material by axially stretching and radially expanding said preform into the shape of said container while said preform is at a temperature at which molecular orientation occurs on stretching, the improvement which comprises exposing only the full wall thickness of the body portion of a thermoplastic preform having a finished neck portion to microwave energy for a period of between ½ to 30 seconds to preferentially heat the body portion to a temperature of between 250 to 320° F. without deforming said neck and without substantially degrading the thermoplastic material forming the preform, said microwave energy being characterized by a frequency of from 100 to 24,000 megahertz and a voltage not in excess of the dielectric breakdown of the thermoplastic material in air, said finished neck preform being formed of a polymer comprising at least 55 weight percent of a polymerized nitrile monomer selected from the group consisting of acrylonitrile, methacrylonitrile and mixtures thereof.

7. The method of claim 6 including the step of transferring said heated preform into an orienting and blow molding station from a heating station.

References Cited

UNITED STATES PATENTS

| | | | |
|---|---|---|---|
| Re. 25,313 | 1/1963 | Walker | 264—Dig. 46 |
| 2,490,416 | 12/1949 | Collins | 264—Dig. 46 |
| 2,331,702 | 10/1943 | Kopitke | 264—94 |
| 2,348,738 | 5/1944 | Hofmann | 264—94 |
| 3,390,426 | 7/1968 | Turner et al. | 264—94 |
| 2,603,741 | 7/1952 | Seifried et al. | 264—Dig. 46 |
| 2,529,863 | 11/1950 | Bowen | 264—Dig. 46 |
| 3,184,524 | 5/1965 | Whiteford | 264—97 |
| 3,624,189 | 11/1971 | Goldman | 264—25 |

JEFFERY R. THURLOW, Primary Examiner

U.S. Cl. X.R.

260—893; 264—89, 97, Digest 46, 29.6; 425—326 B; 219—10.55